(12) United States Patent
Taschner et al.

(10) Patent No.: US 8,748,521 B2
(45) Date of Patent: Jun. 10, 2014

(54) FLAME RETARDANT IMPACT-MODIFIED POLYCARBONATE COMPOSITIONS

(75) Inventors: Vera Taschner, Köln (DE); Thomas Eckel, Dormagen (DE); Achim Feldermann, Düsseldorf (DE); Eckhard Wenz, Köln (DE); Dieter Wittmann, Leverkusen (DE)

(73) Assignee: Bayer MaterialScience, Leverkusen (DE)

( * ) Notice: Subject to any disclaimer, the term of this patent is extended or adjusted under 35 U.S.C. 154(b) by 162 days.

(21) Appl. No.: 12/641,649

(22) Filed: Dec. 18, 2009

(65) Prior Publication Data

US 2010/0160508 A1 Jun. 24, 2010

(30) Foreign Application Priority Data

Dec. 23, 2008 (DE) .......................... 10 2008 062 945

(51) Int. Cl.
*C08K 5/52* (2006.01)

(52) U.S. Cl.
USPC ........................... 524/115; 524/127; 524/130

(58) Field of Classification Search
USPC ........................................................ 524/115
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,419,634 A | 12/1968 | Vaughn, Jr. | |
| 3,553,167 A | 1/1971 | Schnell et al. | |
| 3,692,744 A | 9/1972 | Rich et al. | |
| 4,075,173 A | 2/1978 | Maruyama et al. | |
| 4,176,224 A | 11/1979 | Bier et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,877,831 A | 10/1989 | Hongo et al. | |
| 4,888,388 A | 12/1989 | Hongo et al. | |
| 5,807,914 A | 9/1998 | Obayashi et al. | |
| 6,150,443 A * | 11/2000 | Nodera et al. | ................ 524/157 |
| 6,197,857 B1 * | 3/2001 | Nodera et al. | ................ 524/141 |
| 6,528,561 B1 | 3/2003 | Zobel et al. | |
| 6,949,596 B2 * | 9/2005 | Seidel et al. | .................. 524/121 |
| 7,019,057 B2 * | 3/2006 | Seidel et al. | .................. 524/127 |
| 7,833,448 B2 | 11/2010 | Buchholz et al. | |
| 7,834,075 B2 | 11/2010 | Buchholz et al. | |
| 2002/0077417 A1 | 6/2002 | Itagaki | |
| 2007/0225412 A1 | 9/2007 | Buchholz et al. | |
| 2007/0225413 A1 | 9/2007 | Buchholz et al. | |
| 2007/0282045 A1 * | 12/2007 | Volkers et al. | ................ 524/261 |

FOREIGN PATENT DOCUMENTS

| | | |
|---|---|---|
| DE | 3007934 | 9/1981 |
| DE | 3832396 | 2/1990 |
| DE | 10 2006 012990 A1 | 9/2007 |
| EP | 0430134 | 6/1991 |
| EP | 0641827 | 3/1995 |
| GB | 1464449 | 2/1977 |
| GB | 1552558 | 9/1979 |
| JP | 07-316409 | 12/1995 |
| JP | 08-259791 | 10/1996 |
| JP | 2000-017136 | 1/2000 |
| JP | 2002-069282 | 3/2002 |
| WO | 0000541 | 1/2000 |
| WO | 0039210 | 7/2000 |

OTHER PUBLICATIONS

Notification of Transmittal of Translation of the International Preliminary Report on Patentability issued Jun. 29, 2011 in corresponding International Appl. No. PCT/EP2009/008965.

* cited by examiner

*Primary Examiner* — Doris Lee
(74) *Attorney, Agent, or Firm* — Miles & Stockbridge, P.C.

(57) ABSTRACT

The present disclosure relates to impact-modified polycarbonate compositions which comprise a graft polymer containing silicone/acrylate composite rubber as the graft base, wherein the content of silicone rubber is 65-95 wt. % (based on the graft base), talc having a $d_{98}$ value (also called "top cut") of less than 20 μm and phosphorus-containing flame retardant, the use of the polycarbonate compositions for the production of shaped articles and the shaped articles themselves. The compositions and moulding compositions according to the disclosure have an optimum combination of good flameproofing, good resistance to chemicals and hydrolysis and good mechanical properties (i.e. in particular a high E modulus and high notched impact strength $a_K$).

13 Claims, No Drawings

FLAME RETARDANT IMPACT-MODIFIED POLYCARBONATE COMPOSITIONS

CROSS REFERENCE TO RELATED APPLICATION

This application claims priority from 102008062945 filed 2008-12-23, the content of which is incorporated herein by reference, in its entirety.

BACKGROUND OF THE DISCLOSURE

1. Field of the Disclosure

The present disclosure relates generally to impact-modified polycarbonate compositions which comprise a graft polymer comprising silicone/acrylate composite rubber as the graft base, wherein the content of silicone rubber is 65-95 wt. % (based on the graft base), talc having a $d_{98}$ value (also called "top cut") of less than 20 μm and phosphorus-containing flame retardant, as well as the use of the polycarbonate compositions for production of shaped articles and shaped articles themselves.

2. Description of Related Art

US 2002/077417 A1 discloses flame retardant compositions comprising (a) polycarbonate, (b) graft polymer with a silicone/acrylate composite rubber, wherein the ratio of silicone to acrylate is 99:1 to 1:99, (c) optionally filler, such as, for example, talc, (d) phosphoric acid ester as a flame retardant, (e) optionally further additives, such as, for example, ABS, SAN and antidripping agents. Compositions comprising Metablen® S-2001, which is a graft polymer with a graft base of silicone/butyl acrylate composite rubber which comprises approx. 17 wt. % of methyl methacrylate, approx. 9 wt. % of organosiloxane and approx. 74 wt. % of butyl acrylate, are disclosed as examples. US 2002/077417 A1 does not disclose, however, compositions comprising a graft polymer with a silicone/acrylate composite rubber as the graft base, wherein the content of silicone rubber is 65-95 wt. % (based on the graft base), and talc having a $d_{98}$ value of less than 20 μm.

JP-A 08-259791 discloses flame retardant compositions comprising polycarbonate and a silicone/acrylate rubber with 30-99% of siloxane.

JP-A 2000-017136 discloses compositions comprising polycarbonate, 1 to 40 wt. % of oligomeric phosphoric acid ester and graft polymer with a graft base of silicone/acrylate rubber, which contains 60-99 wt. % of polyorganosiloxane, optionally polytetrafluoroethylene and optionally talc. JP-A 2000-017136 does not disclose, however, compositions comprising a talc having a $d_{98}$ value of less than 20 μm.

JP-A 2002-069282 discloses compositions comprising polycarbonate, composite rubber (such as, for example, Metablen® Sx005), oligomeric phosphoric acid ester, silicone oil, optionally polytetrafluoroethylene and optionally additives. JP-A 2002-069282 does not disclose, however, compositions comprising talc.

WO-A 00/39210 discloses compositions comprising polycarbonate, copolymer, oligomeric phosphoric acid ester, graft polymer (for example Metablen S2001) with a silicone/acrylate rubber as the graft base, wherein the content of polyorganosiloxane is greater than 50 wt. %, preferably greater than 70 wt. %, optionally polytetrafluoroethylene and a reinforcing substance, such as, for example, talc. WO-A 00/39210 does not disclose, however, compositions comprising a talc having a $d_{98}$ value of less than 20 μm.

EP-A 0 641 827 discloses compositions comprising aromatic polycarbonate, graft polymer of vinyl monomer on diene rubber, phosphoric acid ester, polytetrafluoroethylene, inorganic filler, such as, for example, talc, and composite rubber of silicone rubber and acrylate rubber. EP-A 0 641 827 does not disclose, however, compositions comprising a talc having a $d_{98}$ value of less than 20 μm.

JP-A 07316409 discloses compositions comprising polycarbonate, phosphoric acid ester, graft polymer with a silicone/acrylate rubber as the graft base, wherein the content of polyorganosiloxane is 1-99 wt. % and the content of polyalkyl (meth)acrylate rubber is 99-1 wt. %. JP-A 07316409 does not disclose, however, compositions comprising a talc having a $d_{98}$ value of less than 20 μm.

SUMMARY OF THE DISCLOSURE

An object of the present disclosure was to provide flame retardant impact-modified polycarbonate moulding compositions having an optimum combination of good flameproofing, good resistance to chemicals and hydrolysis and good mechanical properties (i.e. in particular high E modulus and high notched impact strength $a_K$).

It has thus been found, surprisingly, that compositions comprising

A) 40 to 99 parts by wt., preferably 59 to 97 parts by wt., particularly preferably 65 to 91 parts by wt. (in each case based on the sum of the parts by weight of components A+B+C+D) of aromatic polycarbonate and/or aromatic polyester carbonate, B) 0.5 to 20 parts by wt., preferably 1 to 12 parts by wt., particularly preferably 2 to 8 parts by wt. (in each case based on the sum of the parts by weight of components A+B+C+D) of graft polymer, characterized in that the graft base is a silicone/acrylate composite rubber of mutually penetrating silicone rubber and polyalkyl (meth)acrylate rubber, wherein the content of silicone rubber is 65-95 wt. % (based on the graft base), C) 0.1 to 20 parts by wt., preferably 1 to 15 parts by wt., particularly preferably 4 to 12 parts by wt. (in each case based on the sum of the parts by weight of components A+B+C+D) of talc having a $d_{98}$ value (also called "top cut") of less than 20 μm, preferably less than 15 μm, particularly preferably less than 8 μm, D) 0.4 to 20 parts by wt., preferably 4 to 17 parts by wt., particularly preferably 8 to 14 parts by wt. (in each case based on the sum of the parts by weight of components A+B+C+D) of flame retardant chosen from at least one of the group consisting of mono- and oligomeric phosphoric and phosphonic acid esters, phosphonatamines and phosphazenes, E) 0 to 20 parts by wt., preferably 0 to 6.5 parts by wt. (based on the sum of the parts by wt. of components A+B+C+D) of one or more polymers chosen from the group consisting of rubber-free vinyl (co)polymer, polyalkylene terephthalate and graft polymers which differ from component B, and particularly preferably the composition is free from rubber-free vinyl (co)polymer, polyalkylene terephthalate and/or graft polymers which differ from component B, F) 0 to 50 parts by wt., preferably 0.5 to 25 parts by wt. (in each case based on the sum of the parts by weight of components A+B+C+D) of additives, wherein all the parts by weight stated in the present application are standardized such that the sum of the parts by weight of components A+B+C+D in the composition is 100, in some embodiments are capable of achieving the above-mentioned technical object as well as other objects.

Additional objects, features and advantages of the disclosure will be set forth in the description which follows, and in part, will be obvious from the description, or may be learned by practice of the disclosure. The objects, features and advantages of the disclosure may be realized and obtained by means of the instrumentalities and combination particularly pointed out in the appended claims.

DETAILED DESCRIPTION

Component A

Aromatic polycarbonates and/or aromatic polyester carbonates according to component A which are suitable according to the disclosure are known from the literature and/or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

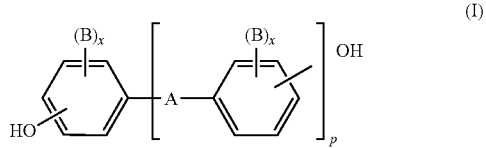

wherein

A is a single bond, $C_1$ to $C_5$-alkylene, $C_2$ to $C_5$-alkylidene, $C_5$ to $C_6$-cyclo-alkylidene, —O—, —SO—, —CO—, —S—, —$SO_2$—, $C_6$ to $C_{12}$-arylene, on to which further aromatic rings optionally containing hetero atoms can be fused, or a radical of the formula (II) or (III)

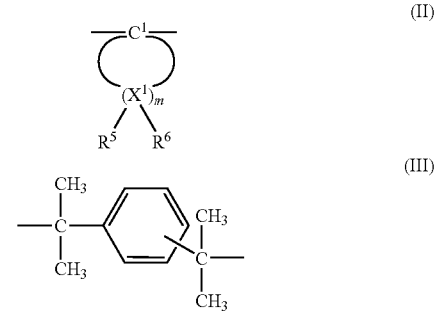

B is in each case $C_1$ to $C_{12}$-alkyl, preferably methyl, or halogen, preferably chlorine and/or bromine, x is in each case independently of one another 0, 1 or 2, p is 1 or 0, and $R^5$ and $R^6$ can be chosen individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1 R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetra-brominated or -chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred. The diphenols can be employed individually or as any desired mixtures. The diphenols are known from the literature or obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates have average weight-average molecular weights ($M_w$, measured e.g. by GPC, ultracentrifuge or light scattering measurement) of from 10,000 to 200,000 g/mol, preferably 15,000 to 80,000 g/mol, particularly preferably 24,000 to 32,000 g/mol.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the disclosure according to component A. These are known (U.S. Pat. No. 3,419,634) and can be prepared by processes known from the literature. The preparation of copolycarbonates containing polydiorganosiloxane is described in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by $C_1$ to $C_{22}$-alkyl groups or by halogen atoms, and aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyesters carbonates can also contain incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-methylbenzyl)-4-methylphenol, 2-(4-hydroxyphenyl)-2-(2,4-dihydroxyphenyl)-propane, tetra-(4-[4-hydroxyphenyl-isopropyl]-phenoxy)-methane or 1,4-bis-[4',4''-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g of polycarbonate or polyester carbonate in 100 ml of methylene chloride solution at 25° C.).

The thermoplastic aromatic polycarbonates and polyester carbonates can be employed by themselves or in any desired mixture.

Component B

Component B preferably includes one or more graft polymers of

B.1 5 to 95 wt. %, preferably 10 to 90 wt. % of one or more vinyl monomers on

B.2 95 to 5 wt. %, preferably 90 to 10 wt. % of one or more silicone/acrylate composite rubbers as the graft base, wherein the silicone/acrylate rubber contains B.2.1 65-95 wt. % of silicone rubber and B.2.2 35 to 5 wt. % of polyalkyl (meth)acrylate rubber, wherein the two rubber components B.2.1 and B.2.2 mentioned are mutually penetrating in the composite rubber, so that they cannot be separated substantially from one another.

The graft copolymers B are prepared by any desired method such as by free-radical polymerization, e.g. by emulsion, suspension, solution or bulk polymerization, preferably by emulsion or bulk polymerization.

Suitable monomers B.1 are vinyl monomers, such as vinylaromatics and/or vinylaromatics substituted on the nucleus (such as styrene, α-methylstyrene, p-methylstyrene and p-chlorostyrene), methacrylic acid ($C_1$-$C_8$)-alkyl esters (such as methyl methacrylate, ethyl methacrylate, 2-ethylhexyl methacrylate and allyl methacrylate), acrylic acid ($C_1$-$C_8$)-alkyl esters (such as methyl acrylate, ethyl acrylate, n-butyl acrylate and t-butyl acrylate), organic acids (such as acrylic acid and methacrylic acid) and/or vinyl cyanides (such as acrylonitrile and methacrylonitrile), and/or derivatives (such as anhydrides and imides) of unsaturated carboxylic acids (for example maleic anhydride and N-phenyl-maleimide). These vinyl monomers can be used by themselves or in mixtures of at least two monomers.

Preferred monomers B.1 are chosen from at least one of the monomers styrene, α-methylstyrene, methyl methacrylate, n-butyl acrylate and acrylonitrile. Methyl methacrylate is particularly preferably employed as the monomer B.1.

The glass transition temperature of the graft base B.2 is <10° C., preferably <0° C., particularly preferably <−20° C. The graft base B.2 in general has an average particle size ($d_{50}$ value) of from 0.05 to 10 µm, preferably 0.06 to 5 µm, particularly preferably 0.08 to 1 µm.

The average particle size $d_{50}$ is the diameter above and below which in each case 50 wt. % of the particles lie. It can be determined by means of ultracentrifuge measurement (W. Scholtan, H. Lange, Kolloid-Z. and Z. Polymere 250 (1972), 782-796).

According to the present disclosure, silicone/acrylate rubbers of high silicone content are generally suitable as graft bases B.2. These silicone/acrylate rubbers are composite rubbers having grafting-active sites which contain a silicone rubber content of 65-95 wt. % and a polyalkyl (meth)acrylate rubber content of 35 to 5 wt. %, the two rubber components mentioned being mutually penetrating in the composite rubber, so that they cannot be separated substantially from one another. Silicone/acrylate rubbers are known and are described, for example, in U.S. Pat. No. 5,807,914, EP 430134 and U.S. Pat. No. 4,888,388.

Suitable silicone rubber components of the silicone/acrylate rubbers are silicone rubbers having grafting-active sites, the preparation method of which is described, for example, in U.S. Pat. Nos. 2,891,920, 3,294,725, DE-OS 3 631 540, EP 249964, EP 430134 and U.S. Pat. No. 4,888,388.

The silicone rubber is preferably prepared by emulsion polymerization, in which siloxane monomer units, crosslinking or branching agents (IV) and optionally grafting agents (V) are employed.

Siloxane monomer units which can be employed are, for example and preferably, dimethylsiloxane or cyclic organosiloxanes having at least 3 ring members, preferably 3 to 6 ring members, such as, for example and preferably, hexamethylcyclotrisiloxane, octamethylcyclotetrasiloxane, decamethylcyclopenta-siloxane, dodecamethylcyclohexasiloxane, trimethyl-triphenyl-cyclotrisiloxanes, tetramethyl-tetraphenyl-cyclotetrasiloxanes and octaphenylcyclotetrasiloxane.

The organosiloxane monomers can be employed by themselves or in the form of mixtures with 2 or more monomers. The silicone rubber preferably contains not less than 50 wt. % and particularly preferably not less than 60 wt. % of organosiloxane, based on the total weight of the silicone rubber component.

Silane-based crosslinking agents having a functionality of 3 or 4, particularly preferably 4, are preferably used as crosslinking or branching agents (IV). There may be mentioned by way of example and preferably: trimethoxymethylsilane, triethoxyphenylsilane, tetramethoxysilane, tetraethoxysilane, tetra-n-propoxysilane and tetrabutoxysilane. The crosslinking agent can be employed by itself or in a mixture of two or more. Tetraethoxysilane is particularly preferred.

The crosslinking agent is employed in a range of amounts of between 0.1 and 40 wt. %, based on the total weight of the silicone rubber component. The amount of crosslinking agent is advantageously chosen such that the degree of swelling of the silicone rubber, measured in toluene, is preferably between 3 and 30, more preferably between 3 and 25, and particularly preferably between 3 and 15. The degree of swelling is defined as the weight ratio between the amount of toluene which is absorbed by the silicone rubber when it is saturated with toluene at 25° C. and the amount of silicone rubber in the dried state. The determination of the degree of swelling is described in detail in EP 249964.

If the degree of swelling is less than 3, i.e. if the content of crosslinking agent is too high, the silicone rubber may not show an adequate rubber elasticity. If the swelling index is greater than 30, the silicone rubber may not be able to form a domain structure in the matrix polymer and therefore also may not be able to improve the impact strength, and the effect could then be similar to simple addition of polydimethylsiloxane.

Tetrafunctional crosslinking agents are often preferred over trifunctional, because the degree of swelling can then be controlled more easily within the limits described above.

Suitable grafting agents (V) include compounds which are capable of forming structures of the following formulae:

$$CH_2=C(R^2)-COO-(CH_2)_p-SiR^1_nO_{(3-n)/2} \quad (V-1)$$

$$CH_2=CH-SiR^1_nO_{(3-n)/2} \quad (V-2) \text{ or}$$

$$HS-(CH_2)_p-SiR^1_nO_{(3-n)/2} \quad (V-3),$$

wherein
$R^1$ represents $C_1$-$C_4$-alkyl, preferably methyl, ethyl or propyl, or phenyl,
$R^2$ represents hydrogen or methyl,
n denotes 0, 1 or 2 and
p denotes an integer from 1 to 6.

Acryloyl- or methacryloyloxysilanes are particularly suitable for forming the above-mentioned structure (V-1) and generally have a high grafting efficiency. An effective formation of the graft chains is thereby generally ensured, and the impact strength of the resulting resin composition is therefore favoured.

There may be mentioned by way of example and preferably: β-methacryloyloxy-ethyldimethoxymethyl-silane, γ-methacryloyloxy-propylmethoxydimethyl-silane, γ-methacryloyloxy-propyldimethoxymethyl-silane, γ-methacryloyloxy-propyl-trimethoxy-silane, γ-methacryloyloxy-propylethoxydiethyl-silane, γ-methacryloyloxy-propyldiethoxymethyl-silane, δ-methacryloyloxy-butyldiethoxymethyl-silanes or mixtures of these.

0 to 20 wt. % of grafting agent, based on the total weight of the silicone rubber, is preferably employed.

Suitable polyalkyl (meth)acrylate rubber components of the silicone/acrylate rubbers can be prepared, for example, from methacrylic acid alkyl esters and/or acrylic acid alkyl esters, a crosslinking agent (VI) and a grafting agent (VII). Preferred methacrylic acid alkyl esters and/or acrylic acid alkyl esters by way of example here are the $C_1$ to $C_8$-alkyl esters, for example methyl, ethyl, n-butyl, t-butyl, n-propyl, n-hexyl n-octyl, n-lauryl and 2-ethylhexyl esters; haloalkyl esters, preferably halo-$C_1$-$C_8$-alkyl esters, such as chloroethyl acrylate, and mixtures of these monomers. n-Butyl acrylate is particularly preferred.

Crosslinking agents (VI) which can be employed for the polyalkyl (meth)acrylate rubber component of the silicone/acrylate rubber are monomers having more than one polymerizable double bond. Preferred examples of crosslinking monomers are esters of unsaturated monocarboxylic acids having 3 to 8 C atoms and unsaturated monohydric alcohols having 3 to 12 C atoms, or of saturated polyols having 2 to 4 OH groups and 2 to 20 C atoms, such as ethylene glycol dimethacrylate, propylene glycol dimethacrylate, 1,3-butylene glycol dimethacrylate and 1,4-butylene glycol dimethacrylate. The crosslinking agents can be used by themselves or in mixtures of at least two crosslinking agents.

Preferred grafting agents (VII) by way of example include allyl methacrylate, triallyl cyanurate, triallyl isocyanurate or mixtures thereof. Allyl methacrylate can also be employed as the crosslinking agent (VI). The grafting agents can be used by themselves or in mixtures of at least two grafting agents.

The amount of crosslinking agent (VI) and grafting agent (VII) is 0.1 to 20 wt. %, based on the total weight of the polyalkyl (meth)acrylate rubber component of the silicone/acrylate rubber.

The silicone/acrylate rubber can be prepared by first preparing the silicone rubber as an aqueous latex. In this context, the silicone rubber can be prepared by emulsion polymerization, as described, for example, in U.S. Pat. No. 2,891,920 and U.S. Pat. No. 3,294,725. For this, a mixture containing organosiloxane, crosslinking agent and optionally grafting agent is mixed with water under the action of shearing forces, for example by a homogenizer, in the presence of an emulsifier based on a sulfonic acid, such as e.g. alkylbenzenesulfonic acid or alkylsulfonic acid, the mixture polymerizing to give the silicone rubber latex. An alkylbenzenesulfonic acid is particularly suitable, since it acts not only as an emulsifier but also as a polymerization initiator. In this case, a combination of the sulfonic acid with a metal salt of an alkylbenzenesulfonic acid or with a metal salt of an alkylsulfonic acid is favourable, because the polymer is thereby stabilized during the later grafting polymerization.

After the polymerization, the reaction is ended by neutralizing the reaction mixture by addition of an aqueous alkaline solution, e.g. by addition of an aqueous sodium hydroxide, potassium hydroxide or sodium carbonate solution.

This latex is then enriched with the methacrylic acid alkyl esters and/or acrylic acid alkyl esters to be used, the crosslinking agent (VI) and the grafting agent (VII), and a polymerization is carried out. An emulsion polymerization initiated by free radicals, for example by a peroxide initiator or an azo or redox initiator, is preferred. The use of a redox initiator system, specifically of a sulfoxylate initiator system prepared by combination of iron sulfate, disodium ethylenediaminetetraacetate, Rongalit and hydroperoxide, is particularly preferred.

The grafting agent (V) used in the preparation of the silicone rubber leads in this context to the polyalkyl (meth)acrylate rubber content typically being bonded covalently to the silicone rubber content. During the polymerization, the two rubber components penetrate each other and in this way form the composite rubber, which generally can no longer be separated into its constituents of silicone rubber component and polyalkyl (meth)acrylate rubber component after the polymerization.

For preparation of the silicone/acrylate graft rubbers B, the monomers B.1 are grafted on to the rubber base B.2.

In this context, the polymerization methods described, for example, in EP 249964, EP 430134 and U.S. Pat. No. 4,888,388 can be used.

For example, the grafting polymerization is carried out by the following polymerization method: The desired vinyl monomers B.1 are polymerized on to the graft base, which is in the form of an aqueous latex, in a one- or multistage emulsion polymerization initiated by free radicals. The grafting efficiency in this context should be as high as possible and is preferably greater than or equal to 10%. The grafting efficiency depends decisively on the grafting agents (V) and (VII) used. After the polymerization to give the silicone/acrylate graft rubber, the aqueous latex is introduced into hot water, in which metal salts, such as e.g. calcium chloride or magnesium sulfate, have been dissolved beforehand. The silicone/acrylate graft rubber coagulates during this procedure and can than be separated.

Component C

Talc is understood as meaning a naturally occurring or synthetically prepared talc, characterized in that the talc has the above-mentioned top cut ($d_{98}$ value) according to the present disclosure. Compositions comprising talc having too high a $d_{98}$ value have the disadvantage that these are more sensitive to hydrolysis and have poorer mechanical properties (lower E modulus and lower notched impact strength) by comparison, i.e. when the same amounts are employed. The $d_{98}$ value describes the particle size below which 98 wt. % of the particles lie. The $d_{98}$ value was determined by measuring the particle size distribution with a Sedigraph 5100 (Micromeritics GmbH, Erftstrasse 43, 41238 Mönchengladbach, Germany).

Pure talc has the chemical composition $3\,MgO.4\,SiO_2.H_2O$ and therefore has an MgO content of 31.9 wt. %, an $SiO_2$ content of 63.4 wt. % and a content of chemically bonded water of 4.8 wt. %. Talc is a silicate having a laminar structure.

Naturally occurring talc materials in general do not have the above-mentioned composition for pure talc, since they are contaminated by replacement of some of the magnesium by other elements, by replacement of some of the silicon by e.g. aluminium and/or by intergrowths with other minerals, such as e.g. dolomite, magnesite and chlorite.

Specific varieties of talc are preferably employed. The specific varieties of talc of the preferred embodiment of the disclosure are distinguished by a particularly high purity, characterized by an MgO content of from 28 to 35 wt. %, preferably 30 to 33 wt. %, particularly preferably 30.5 to 32 wt. % and an $SiO_2$ content of from 55 to 65 wt. %, preferably 58 to 64 wt. %, particularly preferably 60 to 62.5 wt. %. Preferred talc types are furthermore distinguished by an $Al_2O_3$ content of less than 5 wt. %, particularly preferably less than 1 wt. %, in particular less than 0.7 wt. %. A commercially available talc type which corresponds to this definition is e.g. Luzenac® A3 from Luzenac Naintsch Mineralwerke GmbH or Rio Tinto Minerals (Graz, Austria). Talc types which do not meet this purity requirement of the preferred embodiment of the disclosure are e.g. Luzenac® SE-Standard, Luzenac® SE-Super, Luzenac® SE-Micro and Luzenac® ST 10, 15, 20, 30 and 60, all of which are marketed by Luzenac Naintsch Mineralwerke GmbH and Rio Tinto Minerals.

The use of the talc according to component C in the form of types having an average particle size $d_{50}$ of from 0.1 to 4 μm, preferably 0.15 to 3 μm, particularly preferably 0.2 to 2 μm is advantageous in particular. The average particle size $d_{50}$ is the diameter above and below which in each case 50 wt. % of the particles lie. Mixtures of talc types which differ in their average particle size $d_{50}$ can also be employed. The $d_{50}$ value of the talc was determined by measuring the particle size distribution with a Sedigraph 5100 (Micromeritics GmbH, Erftstrasse 43, 41238 Mönchengladbach, Germany).

The talc can be treated on the surface, e.g. silanized, in order to ensure a better compatibility with the polymer. In view of the processing and preparation of the moulding compositions, the use of compacted talc is also advantageous.

Component D

Phosphorus-containing compounds are typically employed as the flame retardant according to component D. These are preferably chosen from the groups of mono- and oligomeric phosphoric and phosphonic acid esters, phosphonatamines and phosphazenes, it also being possible to employ mixtures of several components chosen from one or various of these groups as the flame retardant. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (VIII)

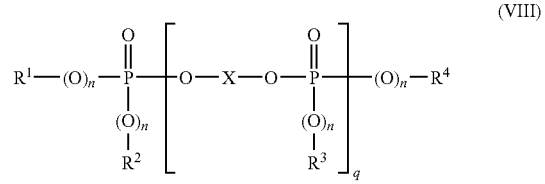

(VIII)

wherein $R^1$, $R^2$, $R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, and/or halogen, preferably chlorine or bromine, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, $R^1$, $R^2$, $R^3$ and $R^4$ independently of one another represent $C_1$ to $C_4$-alkyl, phenyl, naphthyl or phenyl-$C_1$-$C_4$- alkyl. The aromatic groups $R^1$, $R^2$, $R^3$ and $R^4$ can in their turn be substituted by halogen groups and/or alkyl groups, preferably chorine, bromine and/or $C_1$ to $C_4$ alkyl. Particularly preferred aryl radicals are cresyl, phenyl, xylenyl, propylphenyl or butylphenyl and the corresponding brominated and chlorinated derivatives thereof.

X in the formula (VIII) preferably denotes a mono- or polynuclear aromatic radical having 6 to 30 C atoms. This is preferably derived from diphenols of the formula (I).

n in the formula (VIII) can be, independently of one another, 0 or 1, and preferably n is 1.

q represents values from 0 to 30, preferably 0.3 to 20, particularly preferably 0.5 to 10, in particular 0.5 to 6, very particularly preferably 1.05 to 1.6, most preferably 1.05 to 1.2.

X particularly preferably represents

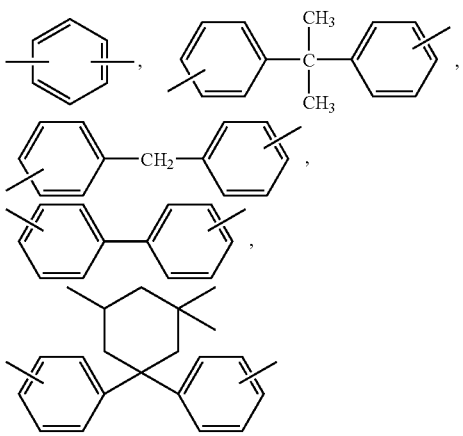

or chlorinated or brominated derivatives thereof, and in particular X is derived from resorcinol, hydroquinone, bisphenol A or diphenylphenol. Particularly preferably, X is derived from bisphenol A.

Mixtures of various phosphates can also be employed as component D according to the present disclosure.

Phosphorus compounds of the formula (VIII) can be, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, resorcinol-bridged oligophosphate and bisphenol A-bridged oligophosphate. The use of oligomeric phosphoric acid esters of the formula (VIII) which are derived from bisphenol A is particularly preferred.

Bisphenol A-based oligophosphate according to formula (VIIIa)

wherein q in formula (VIIIa) represents values from 1.05 to 1.2 is most preferred as component D.

The phosphorus compounds according to component D are known (cf. e.g. EP-A 0 363 608, EP-A 0 640 655) or can be prepared in an analogous manner by known methods (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

If mixtures of various phosphorus compounds are employed, and in the case of oligomeric phosphorus compounds, the q value stated is the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO-A 00/00541 and WO-A 01/18105 can furthermore be employed as flame retardants.

The flame retardants can be employed by themselves or in any desired mixture with one another or in a mixture with other flame retardants.

Component E

Component E is optional and, if employed, it can include, for example, one or more thermoplastic vinyl (co)polymers E.1, polyalkylene terephthalates E.2 and/or graft polymers E.3 which differ from component B, wherein E 1 and/or E 2 are preferred as component E.

Suitable vinyl (co)polymers E.1 include polymers of at least one monomer from the group of vinylaromatics, vinyl cyanides (unsaturated nitriles), (meth)acrylic acid ($C_1$-$C_8$)-alkyl esters, unsaturated carboxylic acids and derivatives (such as anhydrides and imides) of unsaturated carboxylic acids. (Co)polymers which are suitable in particular are those of E.1.1 50 to 99, preferably 60 to 80 parts by wt. of vinylaromatics and/or vinylaromatics substituted on the nucleus, such as styrene, α-methylstyrene, p-methylstyrene and p-chlorostyrene, and/or (meth)acrylic acid ($C_1$-$C_8$)-alkyl esters, such as methyl methacrylate and ethyl methacrylate, and E.1.2 1 to 50, preferably 20 to 40 parts by wt. of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate and t-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers E.1 are resinous, thermoplastic and rubber-free. The copolymer of E.1.1 styrene and E.1.2 acrylonitrile is particularly preferred.

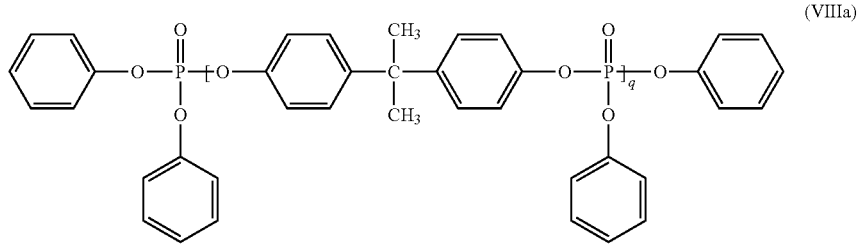

(VIIIa)

The (co)polymers according to E.1 are known and can be prepared by free-radical polymerization, in particular by emulsion, suspension, solution or bulk polymerization. The (co)polymers preferably have average molecular weights Mw (weight-average, determined by light scattering or sedimentation) of between 15,000 and 200,000.

The polyalkylene terephthalates of component E.2 include reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of radicals of ethylene glycol and/or butane-1,4-diol.

The preferred polyalkylene terephthalates can contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

The preferred polyalkylene terephthalates can contain, in addition to radicals of ethylene glycol or propane-1,3-diol or butane-1,4-diol, up to 20 mol % of other aliphatic diols having 3 to 12 C atoms or cycloaliphatic diols having 6 to 21 C atoms, e.g. radicals of 1,3-propanediol, 2-ethylpropane-1,3-diol, neopentyl glycol, 1,5-pentanediol, 1,6-hexanediol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-A 24 07 674, 24 07 776 and 27 15 932).

The polyalkylene terephthalates can be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol and mixtures of these polyalkylene terephthalates are particularly preferred.

Mixtures of polyalkylene terephthalates contain 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

The graft polymers E.3 which differ from component B include, in particular, one or more graft polymers of
E.3.1 5 to 95 wt. % of at least one vinyl monomer on
E.3.2 95 to 5 wt. % of at least one graft base chosen from the group consisting of diene rubbers, EP(D)M rubbers (i.e. those based on ethylene/propylene and optionally diene) and acrylate, polyurethane, chloroprene and ethylene/vinyl acetate rubbers.

Monomers E.3.1 are preferably mixtures of
E.3.1.1 50 to 99 parts by wt. (based on the sum of E.3.1.1 and E.3.1.2, equal to 100 parts by wt.) of vinylaromatics and/or vinylaromatics substituted on the nucleus (such as styrene, α-methylstyrene, p-methylstyrene and p-chlorostyrene) and/or (meth)acrylic acid ($C_1$-$C_8$)-alkyl esters (such as methyl methacrylate and ethyl methacrylate) and
E.3.1.2 1 to 50 parts by wt. (based on the sum of E.3.1.1 and E.3.1.2, equal to 100 parts by wt.) of vinyl cyanides (unsaturated nitriles, such as acrylonitrile and methacrylonitrile) and/or (meth)acrylic acid $C_1$-$C_8$-alkyl esters, such as methyl methacrylate, n-butyl acrylate and t-butyl acrylate, and/or derivatives (such as anhydrides and imides) of unsaturated carboxylic acids, for example maleic anhydride and N-phenyl-maleimide.

Component F

The composition can optionally comprise further commercially available one or more additives according to component F, such as flameproofing synergists, antidripping agents (for example compounds of the substance classes of fluorinated polyolefins, of silicones and aramid fibres), lubricants and mould release agents (for example pentaerythritol tetrastearate), nucleating agents, stabilizers, antistatics (for example conductive carbon blacks, carbon fibres, carbon nanotubes and organic antistatics, such as polyalkylene ethers, alkylsulfonates or polyamide-containing polymers), acids, fillers and reinforcing substances which differ from talc (for example glass fibres or carbon fibres, mica, kaolin, $CaCO_3$ and glass flakes) and dyestuffs and pigments.

Preparation of the Moulding Compositions and Shaped Articles

The thermoplastic moulding compositions according to the present disclosure can be prepared, for example, by mixing the particular constituents in a known manner and subjecting the mixture to melt compounding and melt extrusion at temperatures of from 240° C. to 300° C. in conventional units, such as internal kneaders, extruders and twin-screw extruders.

The mixing of the individual constituents can be carried out in a known manner either successively or simultaneously, and in particular either at about 20° C. (room temperature) or at a higher temperature.

The disclosure likewise provides processes for the preparation of the moulding compositions and the use of the moulding compositions for the production of shaped articles and the mouldings themselves.

The moulding compositions according to the present disclosure can be used for the production of all types of shaped articles. These can be produced by injection moulding, extrusion and blow moulding processes. A further form of processing is the production of shaped articles by thermoforming from previously produced sheets or films.

Examples of such shaped articles are films, profiles, housing components of all types, e.g. for domestic appliances, such as televisions, juice presses, coffee machines and mixers; for office machines, such as monitors, flat screens, notebooks, printers and copiers; sheets, tubes, electrical installation conduits, windows, doors and further profiles for the building sector (interior finishing and exterior uses) and electrical and electronic components, such as switches, plugs and sockets, and vehicle body or interior components for utility vehicles, in particular for the automobile sector.

The moulding compositions according to the present disclosure can also be used in particular, for example, for the production of the following shaped articles or mouldings:

interior finishing components for rail vehicles, ships, aircraft, buses and other motor vehicles, housing of electrical equipment containing small transformers, housing for equipment for processing and transmission of information, housing and lining of medical equipment, massage equipment and housing therefor, toy vehicles for children, planar wall elements, housing for safety equipment and for televisions, thermally insulated transportation containers, mouldings for sanitary and bath fittings, cover grids for ventilator openings and housing for garden equipment.

C-3 Talc having a $d_{98}$ value of 25 μm and an average particle size ($d_{50}$) of 6 μm (Finntalc® M20SL-AW, Mondo Minerals, Amsterdam, The Netherlands)

C-4 Talc having a $d_{98}$ value of 35 μm and an average particle size ($d_{50}$) of 9 μm (Finntalc® M30, Mondo Minerals, Amsterdam, The Netherlands)

Component D
Oligophosphate based on bisphenol A

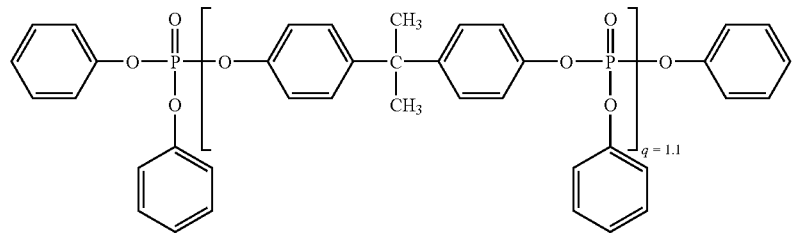

The following examples serve to explain the disclosure further.

EXAMPLES

Component A-1
Unbranched polycarbonate based on bisphenol A having a relative solution viscosity of $\eta_{rel}$=1.28, measured in $CH_2Cl_2$ as the solvent at 25° C. and a concentration of 0.5 g/100 ml.

Component A-2
Unbranched polycarbonate based on bisphenol A having a relative solution viscosity of $\eta_{rel}$=1.20, measured in $CH_2Cl_2$ as the solvent at 25° C. and a concentration of 0.5 g/100 ml.

Component B-1
Impact modifier, graft polymer of
B-1.1 11 wt. % of methyl methacrylate on
B-1.2 89 wt. % of a silicone/acrylate composite rubber as the graft base, wherein the silicone/acrylate rubber contains
B-1.2.1 92 wt. % of silicone rubber and
B-1.2.2 8 wt. % of polyalkyl (meth)acrylate rubber, and wherein the two rubber components B.2.1 and B.2.2 mentioned are mutually penetrating in the composite rubber, so that they cannot be separated substantially from one another.

Component B-2
Impact modifier, graft polymer of
B-2.1 17 wt. % of methyl methacrylate on
B-2.2 83 wt. % of a silicone/acrylate composite rubber as the graft base, wherein the silicone/acrylate rubber contains
B-2.2.1 11 wt. % of silicone rubber and
B-2.2.2 89 wt. % of polyalkyl (meth)acrylate rubber, and wherein the two rubber components B.2.1 and B.2.2 mentioned are mutually penetrating in the composite rubber, so that they cannot be separated substantially from one another.

Component C
C-1 Talc having a $d_{98}$ value of 5 μm and an average particle size ($d_{50}$) of 1 μm (Jetfine® 3CA, Luzenac Naintsch or Rio Tinto Minerals, Graz, Austria)
C-2 Talc having a $d_{98}$ value of 22 μm and an average particle size ($d_{50}$) of 4.5 μm (Finntalc® M15-AW, Mondo Minerals, Amsterdam, The Netherlands)

Component E-1
Copolymer of 77 wt. % of styrene and 23 wt. % of acrylonitrile having a weight-average molecular weight $M_w$ of 130 kg/mol (determined by GPC), prepared by the bulk process.

Component E-2
ABS polymer prepared by bulk polymerization of 82 wt. %, based on the ABS polymer, of a mixture of 24 wt. % of acrylonitrile and 76 wt. % of styrene in the presence of 18 wt. %, based on the ABS polymer, of a polybutadiene/styrene block copolymer rubber having a styrene content of 26 wt. %. The weight-average molecular weight $M_w$ of the free SAN copolymer content in the ABS polymer is 80,000 g/mol (measured by GPC in THF). The gel content of the ABS polymer is 24 wt. % (measured in acetone).

Component F
Component F-1: CFP 6000 N, polytetrafluoroethylene powder (manufacturer: Du Pont, Geneva, Switzerland)
Component F-2: Pentaerythritol tetrastearate
Component F-3: Irganox® B900 (manufacturer: Ciba Specialty Chemicals Inc., Basle, Switzerland)
Component F-4: Pural® 200, AlO (OH) with the boehmite structure (manufacturer: Sasol, Hamburg, Germany)

Preparation and Testing of the Moulding Compositions
The starting substances listed in Tables 1-5 are compounded and granulated on a twin-screw extruder (ZSK-25) (Werner and Pfleiderer) at a speed of rotation of 225 rpm and a throughput of 20 kg/h at a machine temperature of 260° C.

The finished granules are processed on an injection moulding machine to give the corresponding test specimens (melt temperature 260° C., mould temperature 80° C., melt front speed 240 mm/s). Characterization is carried out in accordance with DIN EN ISO 180/1A (Izod notched impact strength, $a_K$), DIN EN ISO 527 (tensile E modulus), DIN ISO 306 (Vicat softening temperature, method B with a load of 50 N and a heating rate of 120 K/h), UL 94 V (measured on bars of dimensions 127×12.7×1.0 mm), ISO 11443 (melt viscosity) and DIN EN ISO 1133 (melt volume flow rate MVR).

The environmental stress cracking (ESC) test (ISO 4599) carried out as follows serves as a measure of the resistance of the compositions prepared to chemicals:
a) With toluene:isopropanol in a vol. ratio of 60:40 as the test medium (ISO 4599), exposure for 5 min at a variable edge fibre elongation, i.e. the edge fibre elongation is determined and that at which fracture of the test specimen occurs is stated.

b) With toluene:isopropanol in a vol. ratio of 60:40 as the test medium (ISO 4599), exposure at an outer fiber strain of 2.4%, i.e. the period of time is determined and that at which fracture of the test specimen occurs is stated.

c) As b), but rape oil as the test medium.

d) As b), but engine oil as the test medium.

The change in the MVR measured in accordance with ISO 1133 at 240° C. with a plunger load of 5 kg after storage of the granules at 95° C. and 100% relative atmospheric humidity (FWL storage) for 7 days serves as a measure of the resistance of the compositions to hydrolysis. In this context, the increase in the MVR value compared with the MVR value before the corresponding storage is calculated as ΔMVR(hydr.), which is defined by the following formula.

$$\Delta MVR(hydr.) = \frac{MVR(\text{after } FWL \text{ storage}) - MVR(\text{before storage})}{MVR(\text{before storage})} \cdot 100\%$$

TABLE 1

Compositions and their properties

| | | 1 | 2 (comp.) | 3 (comp.) | 4 (comp.) |
|---|---|---|---|---|---|
| Components (parts by wt.) | | | | | |
| A-1 | | 69.7 | 69.7 | 69.7 | 69.7 |
| B-1 | | 7.6 | 7.6 | 7.6 | 7.6 |
| C-1 | | 10.1 | | | |
| C-2 | | | 10.1 | | |
| C-3 | | | | 10.1 | |
| C-4 | | | | | 10.1 |
| D | | 12.6 | 12.6 | 12.6 | 12.6 |
| F-1 | | 0.4 | 0.4 | 0.4 | 0.4 |
| F-2 | | 0.4 | 0.4 | 0.4 | 0.4 |
| F-3 | | 0.1 | 0.1 | 0.1 | 0.1 |
| Properties | | | | | |
| $a_K$ | kJ/m² | 26 | 10 | 10 | 9 |
| E modulus | N/mm² | 4,068 | 3,562 | 3,590 | 3,556 |
| Vicat B 120 | ° C. | 100 | 100 | 100 | 100 |
| UL 94 V at 1.0 mm thickness | | V-0 | V-0 | V-0 | V-0 |
| Melt viscosity 260° C. [1,000 s⁻¹] | Pas | 240 | 201 | 208 | 208 |
| Melt viscosity 260° C. [1,500 s⁻¹] | Pas | 196 | 168 | 173 | 172 |
| MVR 240° C./5 kg | cm³/10 min | 11 | 19 | 19 | 16 |
| ΔMVR (hydr.) | % | 33 | 53 | 48 | 80 |
| ESC test (toluene:isopropanol) edge fibre elongation at which fracture occurs | % | >2.4 | >2.4 | >2.4 | >2.4 |
| ESC test (toluene:isopropanol) time to fracture | min | >30 | >30 | >30 | >30 |

It can be seen from Table 1 that the composition with talc type C-1 according to the disclosure has a higher stability to hydrolysis, a higher E modulus (above 3,600 MPa) and a higher notched impact strength (above 10 kJ/m²) compared with the compositions of the comparison examples comprising talc types C-2 to C-4.

It can be seen from Tables 2 to 5 that the compositions with the combination of graft polymer according to the disclosure and talc type C-1 according to the disclosure have better ESC properties and a higher resistance to hydrolysis, with an additionally reduced melt viscosity and the same flame resistance in the UL 94-V test.

TABLE 2

Compositions and their properties

| | | 5 | 6 (comp.) | 7 | 8 (comp.) |
|---|---|---|---|---|---|
| Components (parts by wt.) | | | | | |
| A-1 | | 81.4 | 81.4 | 69.7 | 69.7 |
| B-1 | | 5.0 | | 7.6 | |
| B-2 | | | 5.0 | | 7.6 |
| C-1 | | 5.0 | 5.0 | 10.1 | 10.1 |
| D | | 8.6 | 8.6 | 12.6 | 12.6 |
| F-1 | | 0.4 | 0.4 | 0.4 | 0.4 |
| F-2 | | 0.4 | 0.4 | 0.4 | 0.4 |
| F-3 | | 0.1 | 0.1 | 0.1 | 0.1 |
| Properties | | | | | |
| $a_K$ | kJ/m² | 45 | 42 | 26 | 27 |
| E modulus | N/mm² | 3,124 | 3,151 | 4,068 | 4,329 |
| Vicat B 120 | ° C. | 115 | 116 | 100 | 101 |
| UL 94 V at 1.0 mm thickness | | V-0 | V-0 | V-0 | V-0 |
| Melt viscosity 260° C. [1,000 s⁻¹] | Pas | 361 | 385 | 240 | 253 |
| Melt viscosity 260° C. [1,500 s⁻¹] | Pas | 288 | 305 | 196 | 208 |
| MVR 240° C./5 kg | cm³/10 min | 9 | 9 | 11 | 12 |
| ΔMVR (hydr.) | % | 33 | 38 | 33 | 65 |
| ESC test (toluene:isopropanol) edge fibre elongation at which fracture occurs | % | >2.4 | 2.4 | >2.4 | >2.4 |
| ESC test (toluene:isopropanol) time to fracture | min | 22 | 10 | >30 | >30 |

TABLE 3

Compositions and their properties

| | | 9 | 10 (comp.) | 11 | 12 (comp.) |
|---|---|---|---|---|---|
| Components (parts by wt.) | | | | | |
| A-1 | | 80.8 | 80.8 | 68.1 | 68.1 |
| B-1 | | 5.2 | | 8.0 | |
| B-2 | | | 5.2 | | 8.0 |
| C-1 | | 5.2 | 5.2 | 10.6 | 10.6 |
| D | | 8.8 | 8.8 | 13.3 | 13.3 |
| E-1 | | 2.6 | 2.6 | 5.3 | 5.3 |
| F-1 | | 0.4 | 0.4 | 0.4 | 0.4 |
| F-2 | | 0.4 | 0.4 | 0.4 | 0.4 |
| F-3 | | 0.1 | 0.1 | 0.1 | 0.1 |
| Properties | | | | | |
| $a_K$ | kJ/m² | 36 | 36 | 19 | 17 |
| E modulus | N/mm² | 3,144 | 3,195 | 3,897 | 3,951 |
| Vicat B 120 | ° C. | 114 | 115 | 101 | 98 |
| UL 94 V at 1.0 mm thickness | | V-0 | V-0 | V-0 | V-0 |

TABLE 3-continued

Compositions and their properties

| | | 9 | 10 (comp.) | 11 | 12 (comp.) |
|---|---|---|---|---|---|
| Melt viscosity 260° C. [1,000 s$^{-1}$] | Pas | 306 | 357 | 202 | 211 |
| Melt viscosity 260° C. [1,500 s$^{-1}$] | Pas | 241 | 284 | 163 | 171 |
| MVR 240° C./5 kg | cm$^3$/10 min | 10 | 9 | 13 | 14 |
| ΔMVR (hydr.) | % | 27 | 36 | 29 | 53 |
| ESC test (toluene:isopropanol) edge fibre elongation at which fracture occurs | % | >2.4 | >2.4 | >2.4 | >2.4 |
| ESC test (toluene:isopropanol) time to fracture | min | 27 | 12 | >30 | >30 |

TABLE 4

Compositions and their properties

| | | 13 | 14 (comp.) | 15 | 16 (comp.) |
|---|---|---|---|---|---|
| Components (parts by wt.) | | | | | |
| A-1 | | 66.9 | 66.9 | 56.5 | 56.5 |
| A-2 | | 10.5 | 10.5 | 20.9 | 20.9 |
| B-1 | | 2.3 | | 2.3 | |
| B-2 | | | 2.3 | | 2.3 |
| C-1 | | 6.3 | 6.3 | 6.3 | 6.3 |
| D | | 14.0 | 14.0 | 14.0 | 14.0 |
| E-2 | | 3.5 | 3.5 | 3.5 | 3.5 |
| F-1 | | 0.2 | 0.2 | 0.2 | 0.2 |
| F-2 | | 0.4 | 0.4 | 0.4 | 0.4 |
| F-3 | | 0.1 | 0.1 | 0.1 | 0.1 |
| F-4 | | 0.5 | 0.5 | 0.5 | 0.5 |
| Properties | | | | | |
| $a_K$ | kJ/m$^2$ | 7 | 7 | 6 | 7 |
| E modulus | N/mm$^2$ | 3,464 | 3,409 | 3,466 | 3,350 |
| Vicat B 120 | ° C. | 100 | 101 | 100 | 101 |
| UL 94 V at 1.0 mm thickness | | V-0 | V-0 | V-0 | V-0 |
| Melt viscosity 260° C. [1,000 s$^{-1}$] | Pas | 173 | 179 | 154 | 164 |
| Melt viscosity 260° C. [1,500 s$^{-1}$] | Pas | 146 | 151 | 132 | 140 |
| MVR 240° C./5 kg | cm$^3$/10 min | 31 | 29 | 37 | 34 |
| ΔMVR (hydr.) | % | 20 | 31 | 14 | 33 |
| ESC test (toluene:isopropanol) edge fibre elongation at which fracture occurs | % | 2.4 | 1.8 | 2.4 | 1.8 |
| ESC test (rape oil) time to fracture | min | 13 | 6 | 5 | 4 |
| ESC test (engine oil) time to fracture | h | 144 | 101 | 30 | 24 |

TABLE 5

Compositions and their properties

| | | 17 | 18 (comp.) | 19 | 20 (comp.) |
|---|---|---|---|---|---|
| Components (parts by wt.) | | | | | |
| A-1 | | 72.7 | 72.7 | 74.2 | 74.2 |
| B-1 | | 6.4 | | 4.4 | |
| B-2 | | | 6.4 | | 4.4 |
| C-1 | | 7.5 | 7.5 | 7.7 | 7.7 |
| D | | 13.4 | 13.4 | 13.7 | 13.7 |
| E-2 | | 6.4 | 6.4 | 8.8 | 8.8 |
| F-1 | | 0.4 | 0.4 | 0.4 | 0.4 |
| F-2 | | 0.4 | 0.4 | 0.4 | 0.4 |
| F-3 | | 0.1 | 0.1 | 0.1 | 0.1 |
| Properties | | | | | |
| $a_K$ | kJ/m$^2$ | 31 | 32 | 16 | 14 |
| E modulus | N/mm$^2$ | 3,363 | 3,451 | 3,588 | 3,571 |
| Vicat B 120 | ° C. | 100 | 101 | 100 | 102 |
| UL 94 V at 1.0 mm thickness | | V-0 | V-1 | V-1 | V-0 |
| Melt viscosity 260° C. [1,000 s$^{-1}$] | Pas | 204 | 225 | 189 | 201 |
| Melt viscosity 260° C. [1,500 s$^{-1}$] | Pas | 166 | 183 | 152 | 163 |
| MVR 240° C./5 kg | cm$^3$/10 min | 14 | 12 | 16 | 15 |
| ΔMVR (hydr.) | % | 19 | 30 | 14 | 23 |
| ESC test (toluene:isopropanol) edge fibre elongation at which fracture occurs | % | >2.4 | >2.4 | >2.4 | >2.4 |
| ESC test (toluene:isopropanol) time to fracture | min | >30 | >30 | >30 | >30 |

Additional advantages, features and modifications will readily occur to those skilled in the art. Therefore, the disclosure, in its broader aspects, is not limited to the specific details, and representative devices, shown and described herein. Accordingly, various modifications may be made without departing from the spirit or scope of the general concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:
1. A composition consisting of:
A) 40 to 99 parts by wt. in each case based on the sum of the parts by weight of components A+B+C+D, of aromatic polycarbonate and/or aromatic polyester carbonate,
B) 0.5 to 20 parts by wt., in each case based on the sum of the parts by weight of components A+B+C+D, of graft polymer, wherein the graft base is a silicone/acrylate composite rubber of mutually penetrating silicone rubber and polyalkyl (meth)acrylate rubber, wherein the content of silicone rubber is 65-95 wt. %, based on the graft base, and as a component B, a graft polymer of
B.1 5 to 95 wt.% of at least one vinyl monomer on
B.2 95 to 5 wt.% of one or more silicone/acrylate composite rubbers as the graft base, wherein the silicone/acrylate rubber comprises
B.2.1 65-95 wt.% of silicone rubber and
B.2.2 35 to 5 wt.% of polyalkyl (meth)acrylate rubber, wherein the two rubber components B.2.1 and B.2.2 are mutually penetrating in the composite rubber, such that B.2.1 and B.2.2 cannot be separated substantially from each other, C) 4 to 12 parts by wt., in each case based on the sum of the parts by weight of components A+B+C+D, of talc having a $d_{98}$ value of less than 20 μm and having a $d_{50}$ value of from 0.2 to 2 μm, D) 0.4 to 20 parts by wt., in each case based on the sum of the parts by weight of components A+B+C+D, of at least one flame retardant selected from the group consisting of mono- and oligomeric phosphoric and phosphonic acid esters, phosphonatamines and phosphazenes, and E) greater than 0 to 50 parts by wt., in each case based on the sum of the parts by weight of components A+B+C+D, of at least one additive selected from the group consisting of flameproofing synergists, antidripping agents, lubricants and mould release agents, nucleating agents, stabilizers, acids, fillers and reinforcing substances which differ from talc, dyestuffs and pigments.

2. A composition according to claim 1, wherein the vinyl monomers B.1 are at least one selected from the group consisting of styrene, α-methylstyrene, methyl methacrylate, n-butyl acrylate and acrylonitrile.

3. A composition according to claim 1, comprising as component D bisphenol A-based oligophosphate according to formula (VIIIa)

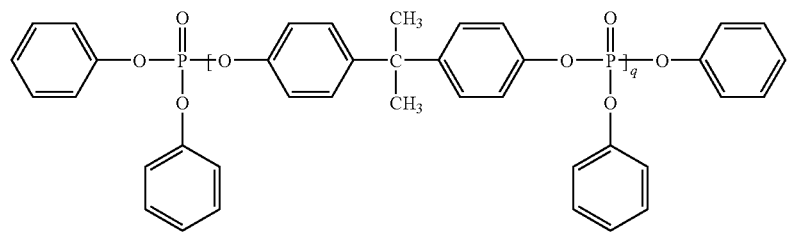

wherein q in formula (VIIIa) represents values from 1.05 to 1.2.

4. A composition according to claim 1, comprising 65 to 91 parts by weight in each case based on the sum of the parts by weight of components A+B+C+D, of component A, 2-8 parts by weight in each case based on the sum of the parts by weight of components A+B+C+D, of component B, and 8-14 parts by weight in each case based on the sum of the parts by weight of components A+B+C+D, of component D.

5. A composition according to claim 1, wherein the composition has an E modulus of 3,600-4,068 MPa.

6. A composition according to claim 1, wherein the composition has a notched impact strength of 10-45 kJ/m2.

7. A composition according to claim 1, wherein the composition has a MVR 240° C/5 kg no higher than 13 cm³/10 min and ΔAMVR (hydr.) no higher than 33%.

8. A composition according to claim 1, comprising as component D, mono- and oligomeric phosphoric or phosphonic acid esters of formula (VIII)

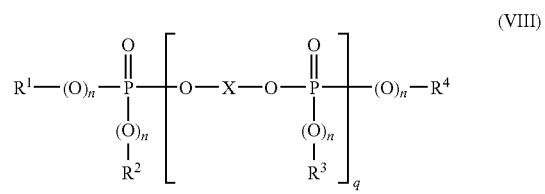

wherein $R^1$, $R^2$, $R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl and/or halogen, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

9. A composition according to claim 8, wherein $R^1$, $R^2$, $R^3$ and $R^4$ represent cresyl, phenyl, xylenyl, propylphenyl or butylphenyl, n is 1, q represents values from 0.5 to 6 and X is derived from resorcinol, hydroquinone, bisphenol A and/or diphenylphenol.

10. A method for production of a shaped article comprising using a composition of claim 1.

11. A shaped article comprising a composition according to claim 1.

12. A shaped article according to claim 11, wherein the shaped article is a part of a motor vehicle, rail vehicle, aircraft or aquatic vehicle and/or a film, profile and/or housing component.

13. A composition consisting of:

A) 40 to 99 parts by wt. in each case based on the sum of the parts by weight of components A+B+C+D, of aromatic polycarbonate and/or aromatic polyester carbonate, B) 0.5 to 20 parts by wt., in each case based on the sum of the parts by weight of components A+B+C+D, of graft polymer, wherein the graft base is a silicone/acrylate composite rubber of mutually penetrating silicone rubber and polyalkyl (meth)acrylate rubber, wherein the content of silicone rubber is 65-95 wt.%, based on the graft base, C) 4 to 12 parts by wt., in each case based on the sum of the parts by weight of components A+B+C+D, of talc having a $d_{98}$ value of less than 20 μm, D) 0.4 to 20 parts by wt., in each case based on the sum of the parts by weight of components A+B+C+D, of at least one flame retardant selected from the group consisting of mono- and oligomeric phosphoric and phosphonic acid esters, phosphonatamines and phosphazenes E) greater than 0 to 20 parts by wt., based on the sum of the parts by weight of components A+B+C+D, of one polymer selected from the group consisting of rubber-free vinyl (co)polymer, polyalkylene terephthalate and graft polymers which differ from component B
F) greater than 0 to 50 parts by wt., in each case based on the sum of the parts by weight of components A+B+C+D, of at least one additive selected from the group consisting of flameproofing synergists, antidripping agents, lubricants and mould release agents, nucleating agents, stabilizers, acids, fillers and reinforcing substances which differ from talc, dyestuffs and pigments.

* * * * *